United States Patent [19]
Levine

[11] Patent Number: 5,848,164
[45] Date of Patent: Dec. 8, 1998

[54] SYSTEM AND METHOD FOR EFFECTS PROCESSING ON AUDIO SUBBAND DATA

[75] Inventor: Scott Levine, Stanford, Calif.

[73] Assignee: The Board of Trustees of the Leland Stanford Junior University, Palo Alto, Calif.

[21] Appl. No.: 655,272

[22] Filed: Apr. 30, 1996

[51] Int. Cl.$^6$ ........................................ H03G 3/00
[52] U.S. Cl. .............................. 381/61; 84/626; 704/278
[58] Field of Search ........................ 381/61, 63; 84/622, 84/630, 626, DIG. 26; 395/2.14, 2.87, 2.91; 704/205, 278, 500

[56] References Cited

U.S. PATENT DOCUMENTS

| | | | |
|---|---|---|---|
| 4,955,057 | 9/1990 | Tominari | 381/63 |
| 5,027,689 | 7/1991 | Fujimori | 84/622 |
| 5,408,580 | 4/1995 | Stautner et al. | 395/2.14 |

OTHER PUBLICATIONS

M. Schoenle, et al.; "Parametric Approximation of Room Impulse Responses by Multirate Systems"; IEEE 1993; pp. I–153—I–156.

N.J. Fliege, et al.; "Multi–Complementary Filter Bank"; Hamburg University of Technology, Germany.

Joseph H. Rothweiler; "Polyphase Quadrature Filters—A New Subband Coding Technique"; IEEE 1983; pp. 1280–1283.

P.P. Vaidyanthan; "Miltirate Systems and Filter Banks"; Prentice–Hall 1993; pp. 353–373.

M. Alexander Broadhead, et al.; "Direct Manipulation of MPEG Compressed Digital Audio"; Dartmouth College, Hanover, New Hampshire.

Fliege, N.J., et al., "Multi–complementary Filter Bank", Hamburg University of Technology, Germany, 4 pages.

PCT Search Report; US97/06496; Aug. 5, 1997.

*Primary Examiner*—Curtis Kuntz
*Assistant Examiner*—Ping W. Lee
*Attorney, Agent, or Firm*—Gary S. Williams; Flehr Hohbach Test Albritton & Herbert LLP

[57] ABSTRACT

An audio effects processing system and method performs audio effects processing on a subband-by-subband basis using less memory and computational resources than audio effects produced through post processing of a fullband audio signal. The input fullband audio signal is split into subbands and the compressed subbands may be stored in memory of the system as compressed audio subband data or may be generated by real time processing of a fullband audio signal. The system stores in memory a set of prototype subband effects filters, the set including echo, flange, chorus, and reverberation effects filters. A subband filter customization procedure allows a sound system designer to build customized versions of the prototype subband effects filters. One or more of the customized subband effects filters are applied to one or more of the subbands comprising the compressed audio subband data. The compressed audio subband data is then processed through a synthesis filter bank which decompresses and decodes the compressed audio subband data to produce a decompressed decoded audio output signal with the audio effects incorporated in it. The system uses less memory and computational resources by applying the customized subband effects filters to less than a full set of subbands comprising the compressed audio subband data without suffering any psychoacoustical loss. Each subband is processed separately and independent of the other subbands. By computing effects separately for each subband, different effects can be performed on different frequency regions. This allows different effects to be placed on the subbands, providing the ability to create a multiband audio effects processor.

12 Claims, 7 Drawing Sheets

FBC - Feedback Comb Filter
AP - Allpass Filter

SYSTEM AND METHOD FOR EFFECTS PROCESSING ON AUDIO SUBBAND DATA

The present invention relates generally to performing audio effects processing on audio subband data for producing audio effects equivalent to those produced by post-processing a decompressed decoded fullband audio signal, where the subband effects processing is accomplished using less memory and computational resources than fullband processing techniques.

BACKGROUND OF THE INVENTION

With the general acceptance of audio compression standards, such as the MPEG I Audio standard, there has been a rapid growth in the use of compressed audio in applications running on personal computers, workstations and other platforms. Examples of applications using compressed audio include recording studios, real-time network audio transmission, direct digital satellite broadcasting, and video conferencing facilities.

For most of the above-mentioned applications, some sort of audio processing, such as adding audio effects or increasing the sound quality, is desired by the sound system designer. Simple examples of this audio processing involve the addition of artificial reverberation for a movie, or an added chorus effect to make vocal recordings sound fuller. Currently, this desired audio processing is achieved by post-processing a decompressed decoded fullband audio signal. Audio post-processing methods taught by the prior art usually require special hardware for computation and large amounts of memory. It would be highly desirable to provide a sound system designer with a system and method that can perform similar audio processing using less memory and computational resources.

The prior art teaches audio and video manipulation techniques, such as dissolve and rotation (see, B. C. Smith and L. A. Rowe, "Algorithms for Manipulating Compressed Images", Computer Graphics and Applications, Vol. 13, No. 5, pp 34–42, September 1993, and B. C. Smith, "Fast Software Processing of Motion JPEG Video," Proc. ACM Multimedia 94, San Francisco, Calif., October 1994), for working with compressed images and video. M. A. Broadhead and C. B. Owen, "Direct Manipulation of MPEG Compressed Digital Audio," Internal report from Bregman Electronic Music Studio, Dartmouth College (1995) teaches simple mixing of audio streams and equalization on compressed audio. However, there is no prior art system or method that can perform effects processing on compressed audio data. Thus, there is a need for a system and method for performing audio effects processing on compressed audio data using less memory and computational resources than currently available fullband audio post-processing techniques.

Furthermore, current audio post-processing methods are limited to generating audio effects on the entire frequency range of a particular audio signal. Although certain prior art techniques have the ability to perform subband-by-subband processing, such techniques have required the use of oversampled transforms, which increases the memory and computational resources used. Thus, there is a need for a system and method that provides the ability to perform audio effects processing on a subband-by-subband basis with little or no psychoacoustical loss, while using significantly less memory and computational resources than processing the corresponding fullband signal.

SUMMARY OF THE INVENTION

In summary, the present invention is a system and method for performing audio effects processing on audio subband data. Subband-by-subband effect processing produces audio effects equivalent to those produced by post-processing a decompressed decoded fullband audio signal. The subband effects processing is accomplished using less memory and computational resources than fullband processing techniques.

The present invention provides a sound system designer with a set of prototype subband effects filters that can be customized by the sound system designer. The set of prototype subband effects filters includes filters to produce echo effects, flange effects, chorus effects, and reverberation effects. By executing a subband filter customization procedure, the sound system designer can create customized versions of a selected prototype subband effects filter by adjusting the values of the parameters associated with the selected prototype audio effects filter. This allows the sound system designer to generate customized subband effects filters that produce audio effects to suit the sound system designer's needs.

Audio effects processing is performed by applying one or more of the customized subband audio effects filters to one or more of the audio subbands of compressed audio subband data. The compressed audio subband data is stored in memory, or can be generated in real time from a fullband fullrate audio input signal using an analysis filter bank. The customized subband effects filters are then applied to one or more subbands of the compressed audio subband data. The compressed audio subband data is then processed by a synthesis filter bank that decodes and decompresses the compressed audio data. The effects processing is performed as part of the decompression and decoding step performed by the synthesis filter bank. There is no need to perform any further post processing using external effects processors. The audio sound effects produced using subband-by-subband processing are psychoacoustically equivalent to corresponding effects produced by processing a fullband audio signal.

By performing audio effects processing on compressed audio subband data, the present invention uses less memory and computational resources than those required by decompressed fullband audio signal post processing techniques to produce equivalent audio effects. By applying the customized subband effects filters on less than a full set of subbands, the present invention saves memory and uses fewer computational resources, and produces effects equivalent to those produced by post processing a decompressed decoded fullband audio signal.

The present invention also allows for multiband effects processing. Each of the subbands of the audio subband data can be processed separately and independent of the other subbands. This allows different customized subband audio effects filters to be placed on the separate subbands. Since effects are computed separately for each subband, different effects can be performed on different frequency regions to achieve multiband effects processing.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
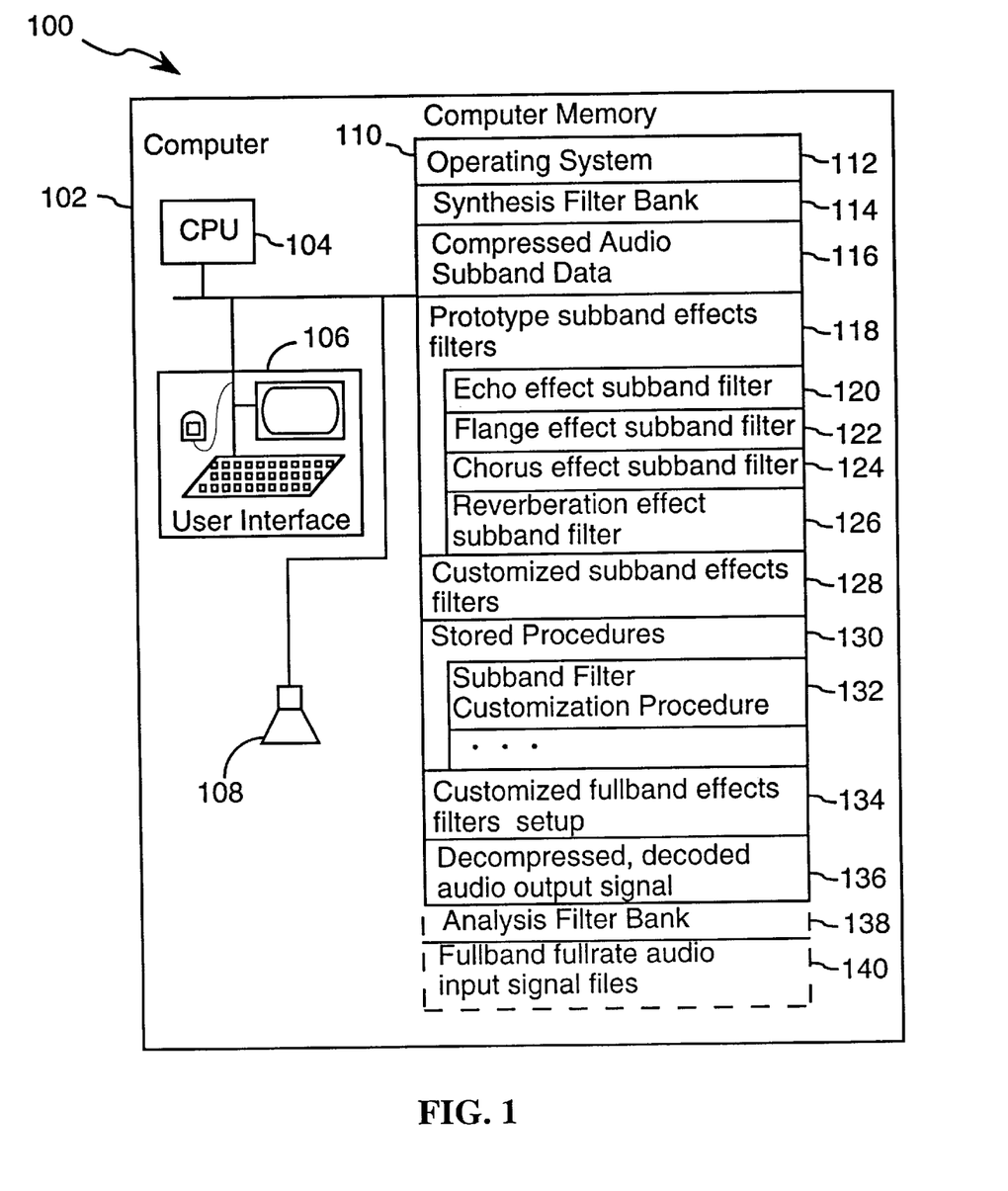
FIG. 1 is a block diagram of a computer system incorporating the audio effects processing system.

Referring to FIG. 1, there is shown an audio effects processing system 100 for performing audio effects processing on compressed audio subband data. The audio effects processing system 100 can be a personal computer, a workstation or any other similar computer platform.

In the preferred embodiment, the audio effects processing system 100 includes a central processing unit (CPU) 104, a user interface 106, an audio output device 108, and memory 110. Memory 110 stores an operating system 112, compressed audio subband data 116, a synthesis filter bank 114 for decompressing and decoding the compressed audio subband data 116, decompressed decoded audio output signal files 136, a set of prototype subband effects filters 118 consisting of audio effects that can be applied to the compressed audio subband data 116, stored procedures 130 including a subband filter customization procedure 132, customized subband effects filters 128, and groups of customized subband effects filters 134.

In the preferred embodiment, the compressed audio subband data 116 is stored in memory 110 of the audio effects processing system 100. Alternately, memory 110 may also store an analysis filter bank 138 that processes in real time a fullband fullrate audio signal received from a real time audio source or from disk files 140. The analysis filter bank is responsible for compressing, encoding and splitting the fullband fullrate audio input signal into subbands of critically sampled compressed audio data 116. Each subband carries critically sampled data for a distinct frequency range, with the 32 subbands covering the frequency range 0 to 22.05 kHz. (i.e., each subband carries data for a frequency range of about 689 Hz.). If other sampling frequencies $F_s$ are used, the frequency range of each subband will be $F_s/32$.

The term "critically sampled subband data" means that the total amount of subband data (i.e., the number of data samples in the subband data) is equal to the amount of data (i.e., number of data samples) prior to its division into subband data. The use of critically sampled subband data is important because it minimizes the number of data samples that need to be processed by the subband effects filters without loosing any of the information content of the signal being processed.

The set of prototype subband effects filters 118 stored in memory 100 comprises of effects filters that can be applied to the compressed audio subband data. This set includes filters to produce echo effects 120, flange effects 122, chorus effects 124, and reverberation effects 126. The filter models corresponding to the echo, flange, chorus, and reverberation effects are shown in FIGS. 3, 4, 5, and 6A–6C respectively.

The subband filter customization procedure 132, when executed by the CPU 104, allows a sound system designer to create customized versions of a selected prototype subband effects filter. The selected prototype subband effects filter can be any one of the subband audio effects filters contained in the set of prototype subband effects filters 118. The subband filter customization procedure allows the sound system designer independent control of the parameters associated with the selected prototype subband effects filter as a function of frequency range. Using the selected prototype subband effects filter as a base template, the sound system designer by executing the subband filter customization procedure 132, can adjust parameters associated with the selected prototype subband effects filter to produce the effect desired by the sound system designer.

As shown in FIGS. 3, 4, 5, and 6A–6C, the parameters that can be customized for each of the selected prototype subband effects filter include a delay line length 301, 401, 501-1,2,3, 601-1,2, one or more feedback scalars 302, 402, and one or more feedforward scalars 403, 502, 602. For example, if the sound system designer wants to create a customized subband flange effect, the designer executes the filter customization procedure and selects the prototype subband flange effects filter shown in FIG. 4. The sound system designer can then adjust the feedforward gain scalar 403, the feedback gain scalar 402, and the delay length 401 parameters to produce a customized flange subband audio effect filter as desired by the designer. The resultant customized subband effects filter can be saved in memory of the audio effects processing system 100. One or more customized subband effects filters can be grouped together to form a user defined group of customized subband effects filters 134 for processing the whole range of compressed audio subband data.

The synthesis filter bank 114 processes the compressed audio subband data 116, which has been processed by subband audio effects filters, to produce a decompressed decoded audio output signal. Thus, there is no need to perform any post-processing of the decoded decompressed audio output signal. Consequently, external audio processors requiring special hardware are no longer needed. Furthermore, audio effects produced using subband-by-subband processing are psychoacoustically equivalent to those produced by post-processing a decompressed audio signal.

Figure 2:
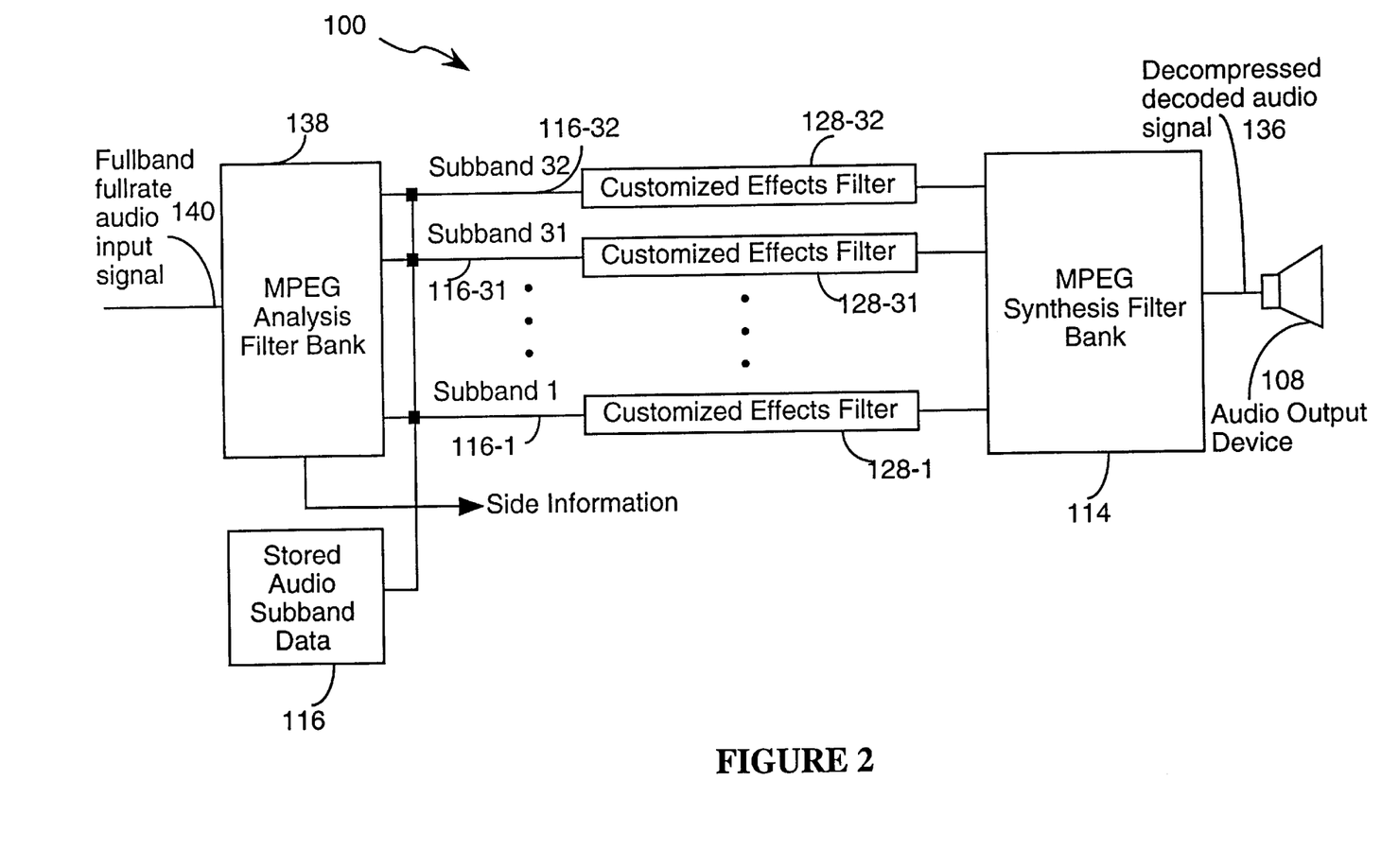
FIG. 2 is a block diagram depicting an exemplary setup of the various components comprising the present invention.

Referring to FIG. 2, there is shown a block diagram depicting an exemplary setup for performing subband-by-subband audio effects processing using an MPEG Audio I standard (MPEG) filter bank which comprises of an analysis filter bank 138 and a synthesis filter bank 114. The MPEG analysis filter bank 138 compresses, encodes and splits the input fullband fullrate audio signal 107 into thirty-two equally spaced subbands 116-1 to -32 of compressed audio data. As mentioned earlier, in the preferred embodiment, the compressed audio subband data 116, comprising the thirty-two equally spaced subbands, is either stored in memory 110 or generated in real time by the analysis filter bank 138.

One or more of the customized subband effects filters 128 generated by the sound system designer can then be applied to one or more subbands 116-1,32. The process of creating the customized subband audio effects filters was explained earlier. After applying the customized subband effects filters 128, the compressed audio subband data 116 is then processed through the synthesis filter bank 114 which synthesizes a decompressed decoded audio output signal 136 from the compressed audio subband data 116. The decompressed decoded audio signal with the audio effects incorporated in it can then be heard using an audio output device. The audio output effects produced are equivalent to effects produced through post-processing a decompressed decoded output signal.

As shown in FIG. 2, the MPEG analysis filter bank outputs data called "side information." The side information generated by the analysis filter bank indicates the relative amount of psychoacoustically important information in each of the 32 subbands. When the analysis filter bank is configured to perform data compression, the side information represents the "bit allocation" for each subband, which indicates the number of bits used to represent the data samples in each subband. Subbands with relatively little information content have data that is quantized with relatively few bits (e.g., 4 bits per data sample), while subbands with larger amounts of information content have data that is quantized with a relatively large bits (e.g., 12 to 16 bits per data sample).

In an alternate embodiment of the present invention, discussed below with reference to FIG. 8, this side information is used to dynamically allocate memory and computational resources to various channels for performing effects processing on various subband channels.

Memory and Computational Resource Savings by Performing Effects Processing on A Subband Level The present invention, by performing audio effects processing on a subband level, uses less memory and computational resources than required by post processing techniques applied to fullband fullrate audio signals to produce equivalent effects. The MPEG filter bank embodiment will be used to illustrate how these memory and computational savings are achieved.

As mentioned earlier, the MPEG filter bank splits the fullband fullrate input audio signal into thirty-two equally spaced critically sampled subbands. The mapping of uniform-frequency effects filters into the individual subbands is accomplished by reducing the length of any delay element in the original fullband filter by the number of subbands (32 for MPEG filter banks using MPEG layers I and II), and multiplying any modulation frequency by the number of subbands. Uniform-frequency effects filters, such as echo, flange, and chorus filters alter the signal the same way for all frequencies. Thus, a single comb filter, such as an echo filter, has a uniform spacing of poles across all frequencies.

Figure 3:
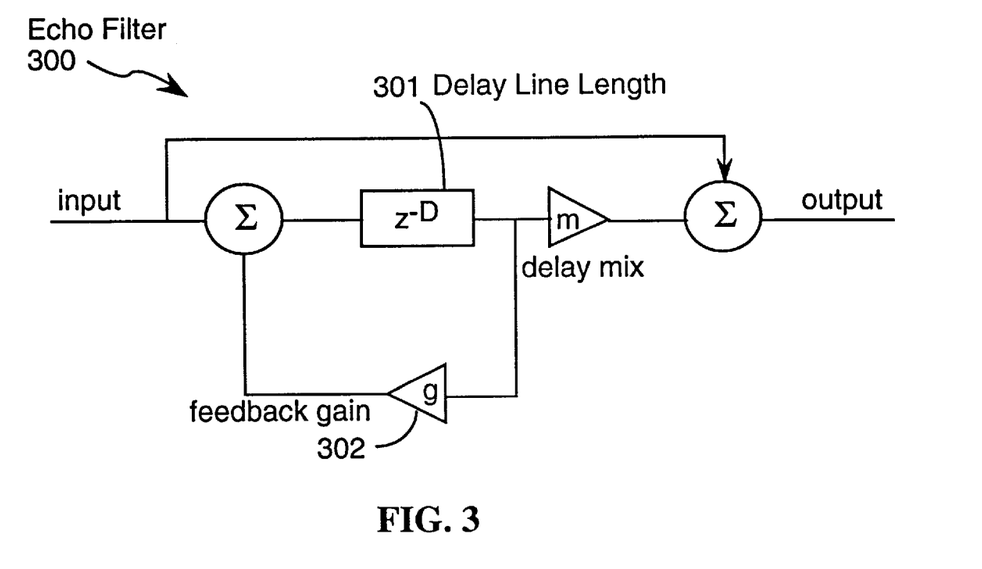
FIG. 3 shows the prototype model of a filter for producing an echo audio effect.

For example, if an echo effect having a delay line length of 300 msec is desired, a subband filter with the design shown in FIG. 3 is used with the same feedback scalars but a 300 msec/32=9.4 msec delay line length. This customized echo effect filter can then be placed on each subband, and then the subbands run through the synthesis filter bank, to produce an audio output signal which emulates the echo effect.

The number of calculations and memory words required for effects processing of 32 critically sampled subbands is equal to that of a fullband fullrate audio signal. This is due to the fact that all the delay line lengths have been reduced by a factor of 32. The subband signals each flow (i.e., have data samples) at 1/32 of the sampling frequency of the input, which is 44.1 kHz (MPEG allows audio signals to be recorded at 48 kHz, 44.1 kHz, 32 kHz, 22.05 kHz and 16 kHz).

Memory and computational savings are achieved by applying the customized subband effects filters to less than a full set of subbands to achieve results equivalent to those produced by post processing of decompressed audio signals. Since effects filters are applied to less than a full set of subbands, the memory and computational resources used are significantly less than in conventional techniques.

Figure 4:
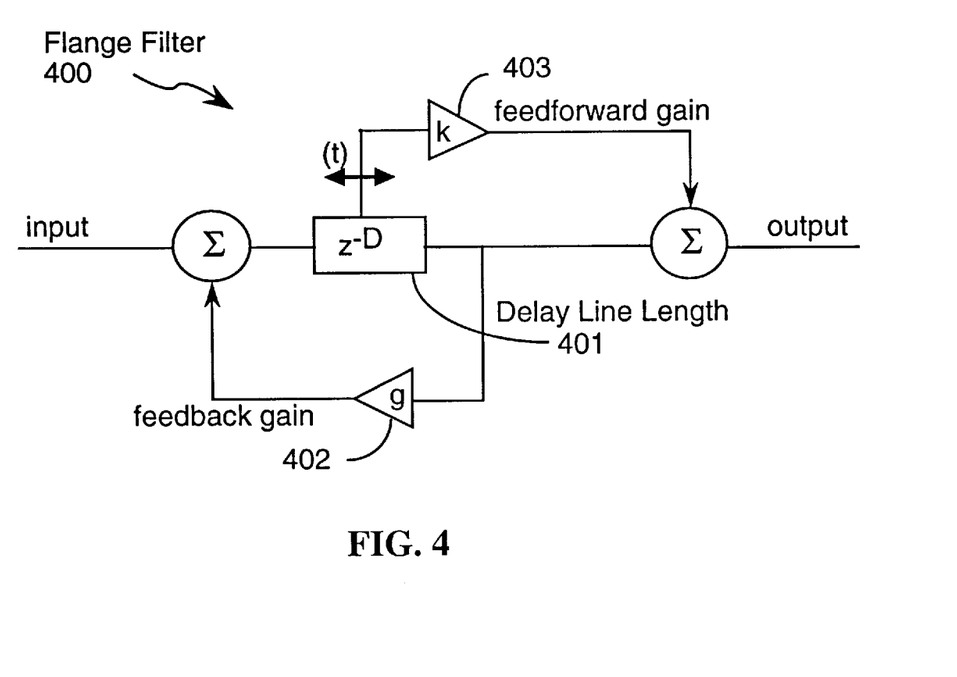
FIG. 4 shows the prototype model of a filter for producing a flange audio effect.
Figure 5:
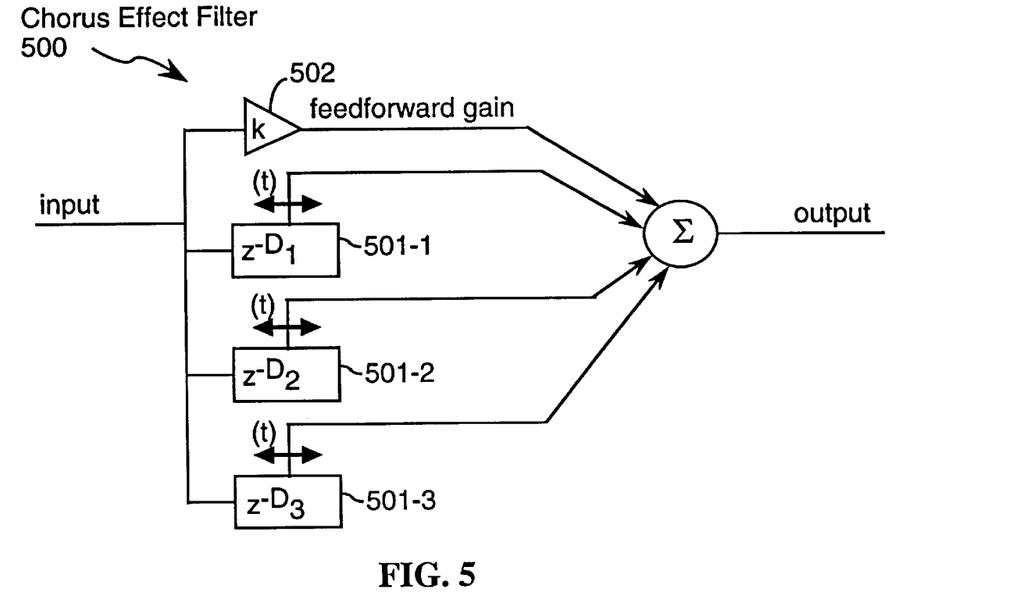
FIG. 5 shows the prototype model of a filter for producing a chorus audio effect.
Figure 6A:
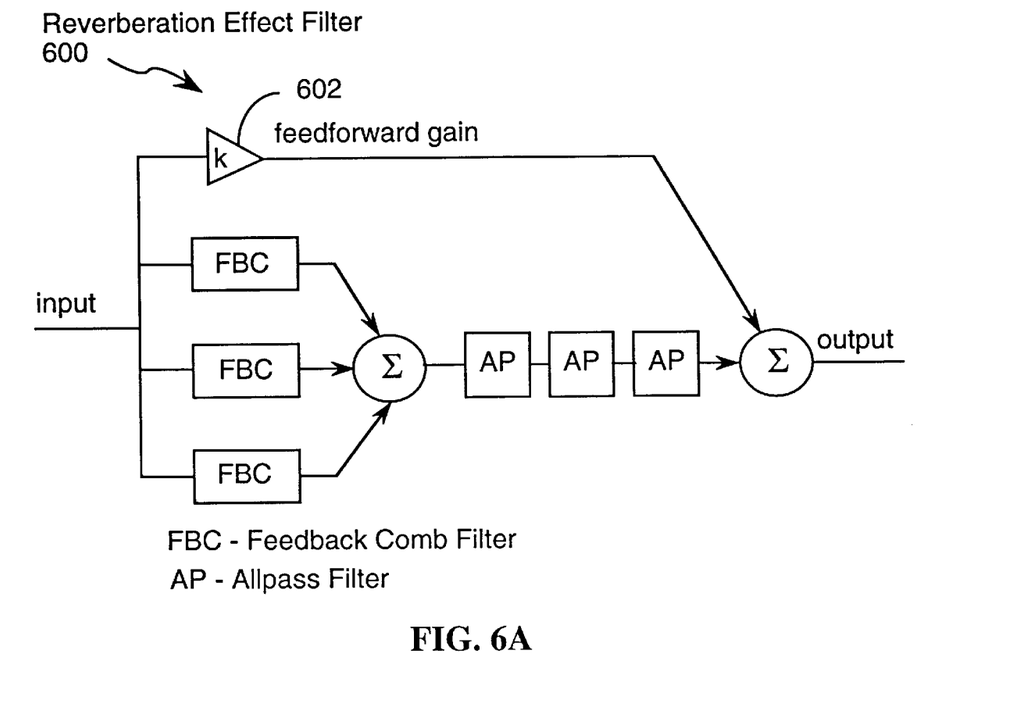
FIGS. 6A, 6B and 6C show the prototype model of a filter for producing a reverberation audio effect.
Figure 6B:
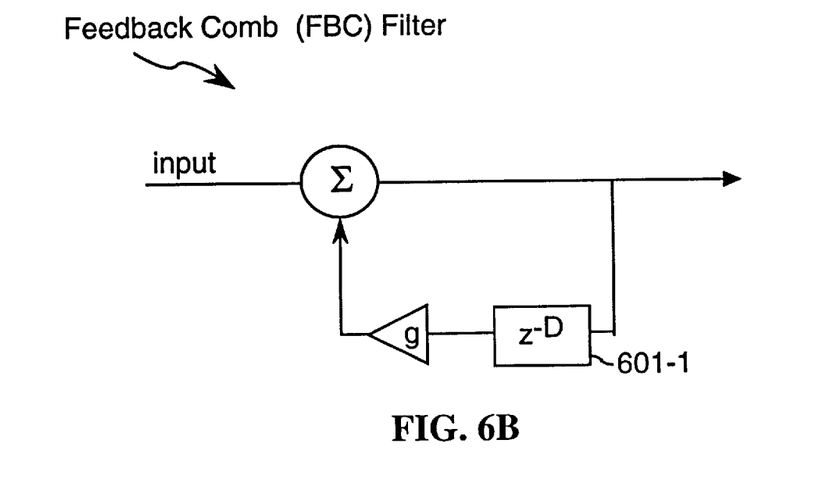
Figure 6C:
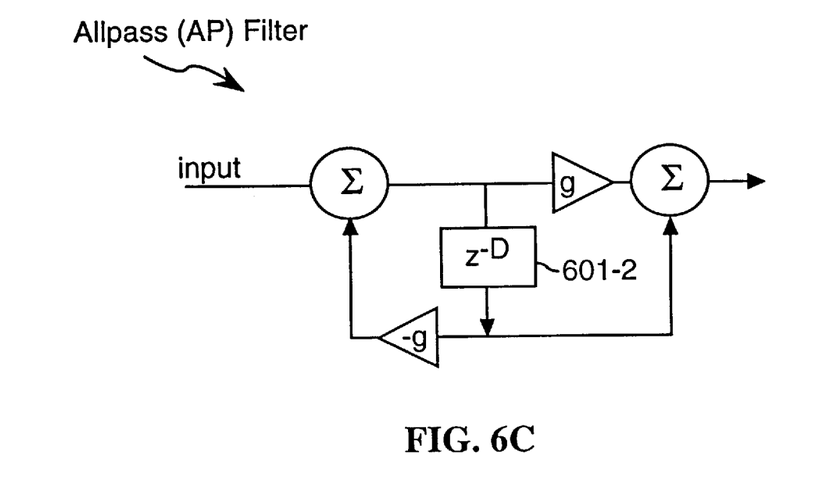

Memory and computational savings achieved by selective application of the effects filters to a subset of the subbands can be illustrated using the flange audio effects filter depicted in FIG. 4. Sound tests have shown that to produce a flange audio effect, it does not make much difference if subbands 16 through 32 are not flanged at all, but passed through unprocessed. Thus, identical flange effects filters can be placed on subbands 1 through 15, leaving subbands 16 through 32 unprocessed. This results in more than a 50% reduction in computation and memory usage as shown by the following calculation.

For an average delay line length of 3 msec, the number of samples (i.e., memory locations for storing audio samples) needed for filtering a fullband signal of sampling frequency 44.1 kHz (which is the sampling frequency at which a filter such as MPEG allows audio signals to be recorded) is calculated as follows:

$$\begin{aligned}
\text{\# of samples needed of fullband} &= 3 \text{ msec} * 44.1 \text{ kHz} \\
&= 132.3 \text{ samples} \\
&= 132 \text{ samples} \\
\text{\# of samples needed of each subband} &= (44.1 \text{ kHz}/32) \times 3 \text{ msec} \\
&= 4.134 \text{ samples per subband} \\
&= 5 \text{ samples}
\end{aligned}$$

For the flange effect, only subbands 1 through 15 are processed while subbands 16 through 32 are left unprocessed. Therefore, $$\begin{aligned}
\text{\# of samples needed for processing subbands 1 through 15} &= 5 \text{ samples per subband} * 15 \\
&= 75 \text{ samples} < 132 \text{ samples}
\end{aligned}$$

Thus, to produce equivalent flange effects, only 75 samples are needed if processing is done on a subband-by-subband basis compared with 132 samples for fullband processing. Consequently, the computational resources and memory needed for filtering 15 of 32 subbands is substantially less than the memory and computational resources needed for fullband filtering.

The same procedure can be applied to the echo and chorus effects, except that only the first 10 subbands need to be processed through the respective audio effects filters. This results in even greater memory and computational resource savings.

Memory and computational resource savings can also be achieved for the reverberation audio effect. Commercial reverberators are typically band limited to 8 kHz (see, P. White, "Creative Recording: Effects and Processors," Music Maker Books, 1989). This cutoff is applied because materials from most room interiors only reflect low frequencies. Therefore, if reverberator audio effects filters are only placed in subbands for the 0 to 8 kHz frequency range, only about 36% of the memory and computational resources that would be required for fullband filtering are utilized to produce equivalent effects.

Applying Different Audio Effects on A Subband Level to Achieve Combinations of Audio Effects As shown in FIG. 2, each one of the thirty-two equally spaced subbands can be processed separately and independent of the other subbands. Since effects are computed separately for each subband, different customized subband effects filters can be placed on different frequency regions. As a result, a customized, multiple audio effects processor is easily implemented using the present invention.

Figure 7:
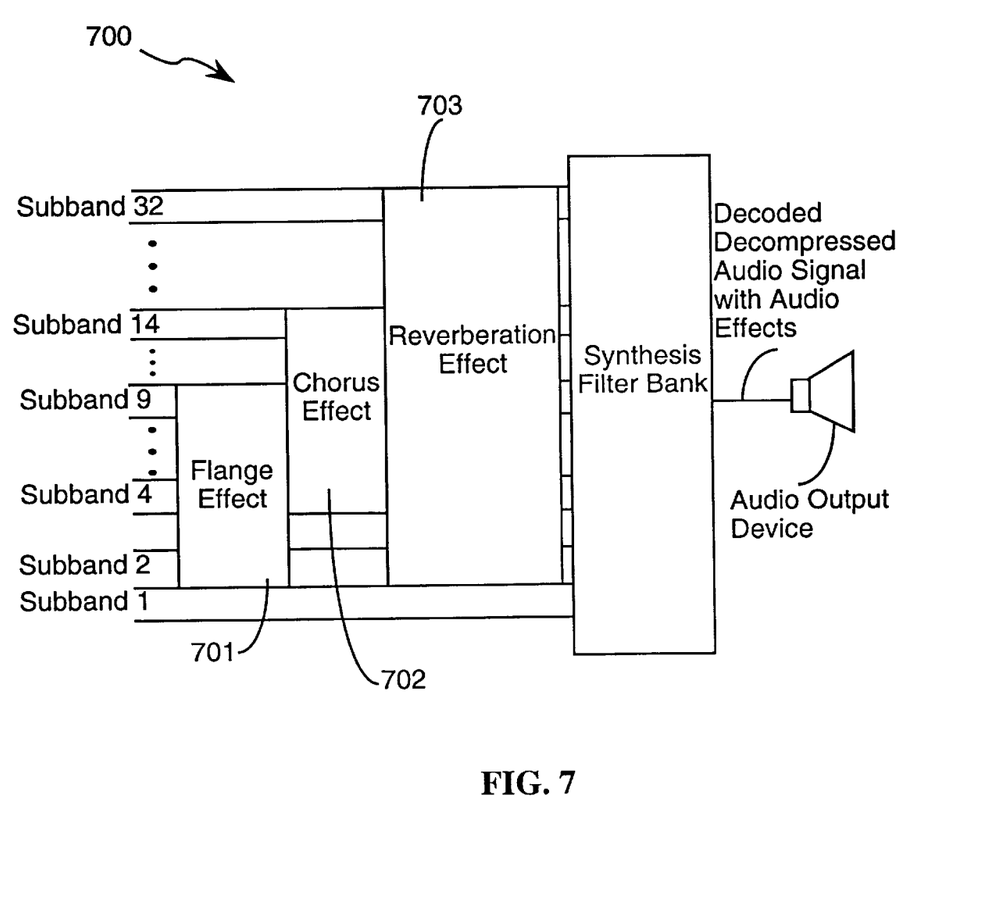
FIG. 7 is an illustration depicting an exemplary setup for producing multiple audio effects by application of different audio effects to the subbands of compressed audio subband data.

For example, consider a case where the music track of a bass player needs to be processed. The lowest frequencies of the input bass audio signal, say below 600 Hz, should be left unaltered so as to preserve the fundamental and first few harmonics. This would translate to not applying a customized subband effects filter to the lowest subband and leaving it unprocessed. But, the other subbands can now be processed without disturbing the timbre of the lowest frequencies. As shown in FIG. 7, a customized flange effect filter 701 could be placed on subbands 2 through 9 for frequencies of approximately 600 to 6000 Hz, a customized chorus effect filter 702 could be placed on subbands 4 to 14 for frequencies of approximately 2000 to 10000 Hz, and a customized reverberator effect filter 703 could be placed on subbands 2 to 32 for all frequencies over approximately 600 Hz. This multiband approach leaves the sound system designer many more degrees of freedom when layering effects than were previously available.

Alternate Embodiments

Figure 8:
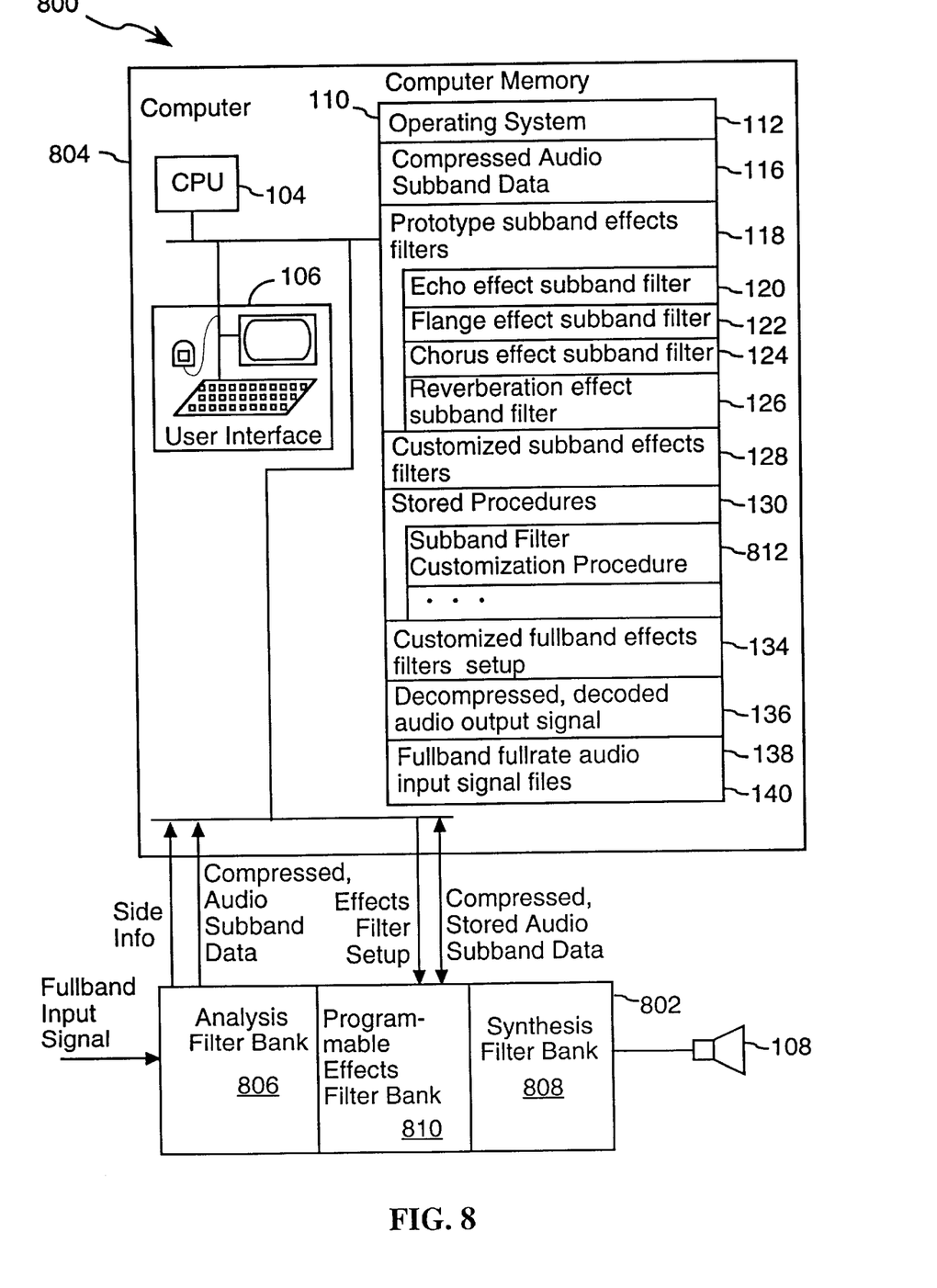
FIG. 8 is a block diagram of an alternate embodiment of the present invention.

FIG. 8 shows an audio signal processing system 800 that is similar to the system 100 shown in FIG. 1, except that the analysis filter bank, effects filters and synthesis filter bank are implemented in an "MPEG and filter effects" integrated circuit 802 that is controlled by a host computer 804. As just mentioned, circuit 802 includes an MPEG analysis filter bank 806, and an MPEG synthesis filter bank 808. The circuit 802 also includes a programmable effects filter bank 810 that is programmable in by the host computer 804 in much the same way that a field programmable logic array (FPLA) can be programmed by downloading a binary file of connection control data into the circuit 802.

The host computer 804 receives from the analysis filter bank 806 side information that indicates the relative amount of psychoacoustically important information in each of the 32 subbands generated by the analysis filter bank 806. From the side information the host computer can dynamically allocate effects filters using the resources available in the programmable effects filter bank 810. In particular, in addition to using the side information to determine which channels to filter with various effects, the delay line length for filters such as the reverb, chorus and flange effects filters can be varied in accordance with the amount of psychoacoustically important information in each of the 32 subbands, such that bands with more psychoaccoustically important information are assigned filters with longer delay lines than bands with less psychoaccoustically important information. This allocation of effects filters, and delay line lengths within those effects filters is performed by a subband filter customization procedure 812 that takes into account the side information as well as the limited resources available in the programmable effects filter bank 810.

Since the amount of computational resources required to preform effects filtering is proportional to delay line lengths, both memory and computational resources can be dynamically allocated as a function of the side information provided by the MPEG encoder (i.e., analysis filter bank).

The host computer can receive for storage (e.g., on disk or tape storage media) compressed audio subband data from the analysis filter bank 806, or from the programmable effects filter bank after the subband data has been filtered by the effects filters. The host computer can also transmit subband data from memory 110 to the programmable effects filter bank 810 for effects processing.

The dynamic allocation of memory and computation resources based on side information from the MPEG encoder can also be performed in workstation based implementations of the invention such as the system 100 shown in FIG. 1.

While the preferred embodiment of the present invention uses an MPEG filter bank because it is an efficient transform, and is a standard that is already available on many platforms all over the world, other filter banks that produce critically sampled subbands, each covering a different frequency range, can also be used with the present invention.

For instance, the present invention can be used in a system in which the MPEG filter bank is cascaded with FFT vocoders on each subband, that further divides the audio subband signals into smaller, complex frequency bands of varying finer frequency resolution. The lowest frequency subbands could have vocoders of frequency resolution as small as 2 Hz, while the highest freqency subbands could have vocoders with poorer frequency resolution such as 50 Hz, allowing better time resolution.

Vocoder-style effects require higher frequency resolution than MPEG filter banks require (MPEG uses 44.1 kHz/32= 687 Hz wide subbands). In order to increase this frequency resolution, it is required to perform a Fast Fourier Transform (FFT) on each MPEG subband. It is also necessary to generate magnitude and phase at each bin for a vocoder. The means that each bin output must be complex, and this requires the use of a complex transform like the FFT. The output of the MPEG filter bank subbands are real-valued (not complex) signals, and one cannot extract magnitude and phase from these signals without an additional complex FFT.

Certain effects, especially time stretching and compressing, can be performed on the resulting subband vocoder data without distortion of the pitch (i.e., frequency characteristics) of the resulting signal. Furthermore, memory and computation resources can be allocated to these narrow subbands based on the relative amount of psycho-accoustically important information in the various bands.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. An audio effects processing system for performing audio effects processing on compressed audio subband data, said system comprising:

an audio output device for hearing results of audio effects processing;

a data processor coupled to said audio output device;

a memory coupled to said data processor, said memory storing compressed audio subband data, a set of prototype subband effects filters, customized subband effects filters, and stored procedures that are executed by said data processor;

said compressed audio subband data comprising subbands each covering a different frequency range;

said set of prototype subband effects filters including effects filters corresponding to different audio effects that can be applied on a subband-by-subband basis;

said stored procedures including a subband filter customization procedure for creating said customized subband effects filters by customizing one or more prototype subband effects filters from said set of prototype subband effects filters; and a synthesis filter bank coupled to said data processor for decoding said audio subband data, and performing audio effects processing on said compressed audio subband data as part of said audio subband data decoding, said audio effects processing performed by applying one or more of said customized subband effects filters to a subset of said subbands of said compressed audio subband data, wherein said subset is less than the full set of said subbands, said audio effects processing producing audio effects psychoacoustically equivalent to audio effects produced by post processing a corresponding fullband, decompressed decoded audio signal, where said subband data comprises subbands of compressed, critically sampled audio subband data.

2. The system of claim 1, wherein said synthesis filter bank in performing said audio effects processing uses less memory and computational resources than would be required for achieving psychoacoustically equivalent audio effects on an decompressed decoded audio signal.

3. The system of claim 1, wherein said synthesis filter bank performs said audio effects processing by applying different ones of said customized subband effects filters and combinations thereof to different subsets of said subbands of said compressed audio subband data to achieve combinations of audio signal effects.

4. The system of claim 1, wherein said set of prototype subband effects filters includes at least two audio effects filters from the set consisting essentially of an echo effects filter, a flange effects filter, a chorus effects filter, and a reverberation effects filter.

5. The system of claim 1, further comprising:

an analysis filter bank coupled to said data processor for compressing, encoding, and splitting a fullband audio signal into said compressed audio subband data.

6. A method for performing audio effects processing on compressed audio subband data, said method comprising the steps of:

providing memory storage for compressed audio subband data, a set of prototype subband effects filters, customized subband effects filters, and stored procedures that are executed by a data processor, said compressed audio subband data comprising subbands each covering a different frequency range, said set of prototype subband effects filters including effects filters corresponding to different audio effects that can be applied on a subband-by-subband basis, said stored procedures including at least one subband filter customization procedure;

executing said subband filter customization procedure to customize one or more prototype subband effects filters from said set of prototype subband effects filters to create said customized subband effects filters;

performing decompression and decoding of said compressed audio subband data, and performing audio effects processing on said compressed audio subband data as part of said decompression and decoding, said audio effects processing performed by applying one or more of said customized subband effects filters to a subset of said subbands of said compressed audio subband data, wherein said subset is less than the full set of said subbands, said audio effects processing producing audio effects psychoacoustically equivalent to audio effects produced by post processing a corresponding fullband, decompressed decoded audio signal, where said subband data comprises subbands of compressed, critically sampled audio subband data.

7. The method of claim 6, wherein said audio effects processing uses less memory and computational resources than would be required for achieving psychoacoustically equivalent audio effects on a decompressed decoded audio signal.

8. The method of claim 6, wherein said audio effects processing is performed by applying different ones of said customized subband effects filters and combinations thereof to different subsets of said subbands of said compressed audio subband data to achieve combinations of audio signal effects.

9. The method of claim 6, wherein said set of prototype subband effects filters includes at least two audio effects filters from the set consisting essentially of an echo effects filter, a flange effects filter, a chorus effects filter, and a reverberation effects filter.

10. The method of claim 6, further comprising the steps of:

compressing, encoding and splitting a fullband audio signal into said compressed audio subband data.

11. An audio effects processing system for performing audio effects processing on compressed audio subband data, said system comprising:

a set of subband effects filters, each for filtering audio subband data to generate an audio effect; said set of subband effects filters including a first set of effects filters for performing a first predefined audio effect; and a data processor for filtering a set of N parallel streams of audio subband data with said set of subband effects filters to produce an output signal, including applying said first set of subband effect filters to a subset of said N parallel streams of subband data, wherein said subset is less than the full set of said subbands; said filtering by said first set of subband effects filters producing audio effects psychoacoustically equivalent to audio effects produced by post processing a corresponding fullband audio signal, where said subband data comprises subbands of compressed, critically sampled audio subband data.

12. The system of claim 11, wherein said first set of subband effect filters includes M filters, where M<N; and said M subband effect filters include delay lines that utilize a total of approximately M×Z memory locations in said memory, where Z is an integer greater than zero and where an acoustically equivalent fullband effect filter would utilize approximately N×Z memory locations.

* * * * *